United States Patent
Tsai et al.

(10) Patent No.: US 10,491,669 B2
(45) Date of Patent: Nov. 26, 2019

(54) GROUP HOST SELECTION METHOD FOR DEVICE-TO-DEVICE NETWORK AND CONTROL PLATFORM FOR SELECTING GROUP HOST

(71) Applicants: WISTRON NEWEB CORPORATION, Hsinchu (TW); INDUSTRIAL TECHNOLOGY RESEARCH INSTITUTE, Hsinchu (TW)

(72) Inventors: I-Hsing Tsai, Hsinchu (TW); Chuan-Yuan Huang, Hsinchu (TW); Ying-Chuan Chen, Hsinchu (TW); Feng-Zhong Hsu, Hsinchu (TW)

(73) Assignees: WISTRON NEWEB CORPORATION, Hsinchu (TW); INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 203 days.

(21) Appl. No.: 15/725,318

(22) Filed: Oct. 5, 2017

(65) Prior Publication Data
US 2019/0052703 A1    Feb. 14, 2019

(30) Foreign Application Priority Data
Aug. 11, 2017    (TW) .............................. 106127311 A

(51) Int. Cl.
*G06F 15/173*    (2006.01)
*H04L 29/08*    (2006.01)
*H04L 12/66*    (2006.01)
*H04L 12/26*    (2006.01)
*H04L 12/721*    (2013.01)

(52) U.S. Cl.
CPC ............ *H04L 67/101* (2013.01); *H04L 12/66* (2013.01); *H04L 43/0864* (2013.01); *H04L 67/1008* (2013.01); *H04L 45/70* (2013.01); *H04L 67/12* (2013.01); *H04L 67/34* (2013.01)

(58) Field of Classification Search
CPC ...... H04B 7/0632; H04W 40/12; H04W 4/08; H04W 52/241; H04W 84/20; H04L 45/22; H04L 47/10; H04L 67/1004
See application file for complete search history.

(56) References Cited

U.S. PATENT DOCUMENTS 8,422,481 B2    4/2013 Hanuni et al.
8,761,099 B2    6/2014 Charbit et al.
(Continued)

*Primary Examiner* — Oleg Survillo
(74) *Attorney, Agent, or Firm* — Li & Cai Intellectual Property (USA) Office

(57) ABSTRACT

A group host selection method for a device-to-device network and a control platform for selecting a group host are provided. The device-to-device network includes a user device and a gateway device, the group host selection method includes the steps of: calculating a signal reception capability corresponding to a transmission path from the gateway device to the user device; calculating a first computation capability of the gateway device; calculating a second computation capability of the user device; and selecting one of the user device and the gateway device to be a group host according to the signal reception capability and the first computation capability of the gateway device and the second computation capability of the user device.

15 Claims, 9 Drawing Sheets

(56) References Cited

U.S. PATENT DOCUMENTS

| | | | |
|---|---|---|---|
| 9,055,076 B1* | 6/2015 | Sorenson, III | H04L 67/1008 |
| 9,100,103 B2 | 8/2015 | Okada | |
| 2002/0150065 A1* | 10/2002 | Ponnekanti | H04B 7/0617 |
| | | | 370/334 |
| 2011/0131338 A1 | 6/2011 | Hu | |
| 2015/0208431 A1* | 7/2015 | Chen | H04W 4/08 |
| | | | 370/329 |

* cited by examiner

GROUP HOST SELECTION METHOD FOR DEVICE-TO-DEVICE NETWORK AND CONTROL PLATFORM FOR SELECTING GROUP HOST

FIELD OF THE INVENTION

The present disclosure relates to a group host selection method for a network and a control platform for selecting a group host, in particular to a group host selection method for a device-to-device network and a control platform for selecting a group host.

BACKGROUND OF THE INVENTION

In the first-generation of the Internet of Things (IoT), a gateway device is configured to collect information of the Internet of Things without analysis and computation. Information analysis and computation are processed by a data center in the Internet of Things.

However, with the increasing amount of information in the Internet of Things and a trend of Big Data, research and development on an Internet of Things system with an edge cloud service capable of collecting, analyzing and computing information simultaneously has become important.

SUMMARY OF THE INVENTION

The present disclosure provides a group host selection method for a device-to-device network, the device-to-device network includes a user device and a gateway device, and the group host selection method includes the following steps: calculating a signal reception capability corresponding to a transmission path from the gateway device to the user device; calculating a first computation capability of the gateway device; calculating a second computation capability of the user device; and selecting one of the user device and the gateway device in the device-to-device network to be a group host according to the signal reception capability and the first computation capability of the gateway device and the second computation capability of the user device.

In an embodiment, the transmission path includes a plurality of nodes and the signal reception capability is obtained by a set of received signal fading rates of each two adjacent nodes in the transmission path.

In an embodiment, each of the gateway device and the user device includes a processor and a storage unit, the first computation capability is determined by a remaining load rate of the processor of the gateway device and a remaining usage rate of the storage unit of the gateway device, and the second computation capability is determined by a remaining load rate of the processor of the user device and a remaining usage rate of the storage unit of the user device.

In an embodiment, the group host selection method further includes the following steps: calculating a first response capability of the gateway device; and calculating a second response capability of the user device. The first and second response capabilities are calculated by the following formula:

$$D_i = \frac{T_{max} - T_i}{T_{max}},$$

i is equal to 1-2, $D_i$'s are the first and second response capabilities, $T_i$'s are a first delay time of a first communication circuit in the gateway device and a second delay time of a second communication circuit in the user device, $T_{max}$ is a greater one of the first delay time and the second delay time.

Another embodiment of the present disclosure provides a group host selection method for a device-to-device network, the device-to-device network including a first user device, a second user device and a gateway device, the group host selection method including the following steps: calculating a first signal reception capability of the gateway device according to a first parameter corresponding to a first transmission path from the gateway device to the first user device and a second parameter corresponding to a second transmission path from the gateway device to the second user device; calculating a second signal reception capability of the first user device according to a third parameter corresponding to a third transmission path from the first user device to the second user device; and calculating a third signal reception capability of the second user device according to a fourth parameter corresponding to a fourth transmission path from the second user device to the first user device. One of the first user device, the second user device and the gateway device in the device-to-device network is selected to be a group host according to the first to third signal reception capabilities.

Yet another embodiment of the present disclosure provides a control platform selecting a group host in a device-to-device network, the device-to-device network including a first user device, a second user device and a first gateway device, the control platform including: a processing circuit; and a storage circuit storing a determination module. The determination module instructs the processing circuit to select one of the first user device, the second user device and the gateway device to be the group host according to a first signal reception capability calculated by a first parameter corresponding to a first transmission path from the gateway device to the first user device, and a second parameter corresponding to a second transmission path from the gateway device to the second user device, according to a second signal reception capability calculated by a third parameter corresponding to a third transmission path from the first user device to the second user device, and according to a third signal reception capability calculated by a fourth parameter corresponding to a fourth transmission path from the second user device to the first user device.

The present disclosure provides a group host selection method and a control platform selecting a group host in a device-to-device network, and the selected group host may collect, analyze and compute information simultaneously.

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a group host selection method for device-to-device network and control platform for selecting a group host according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

Figure 1A:
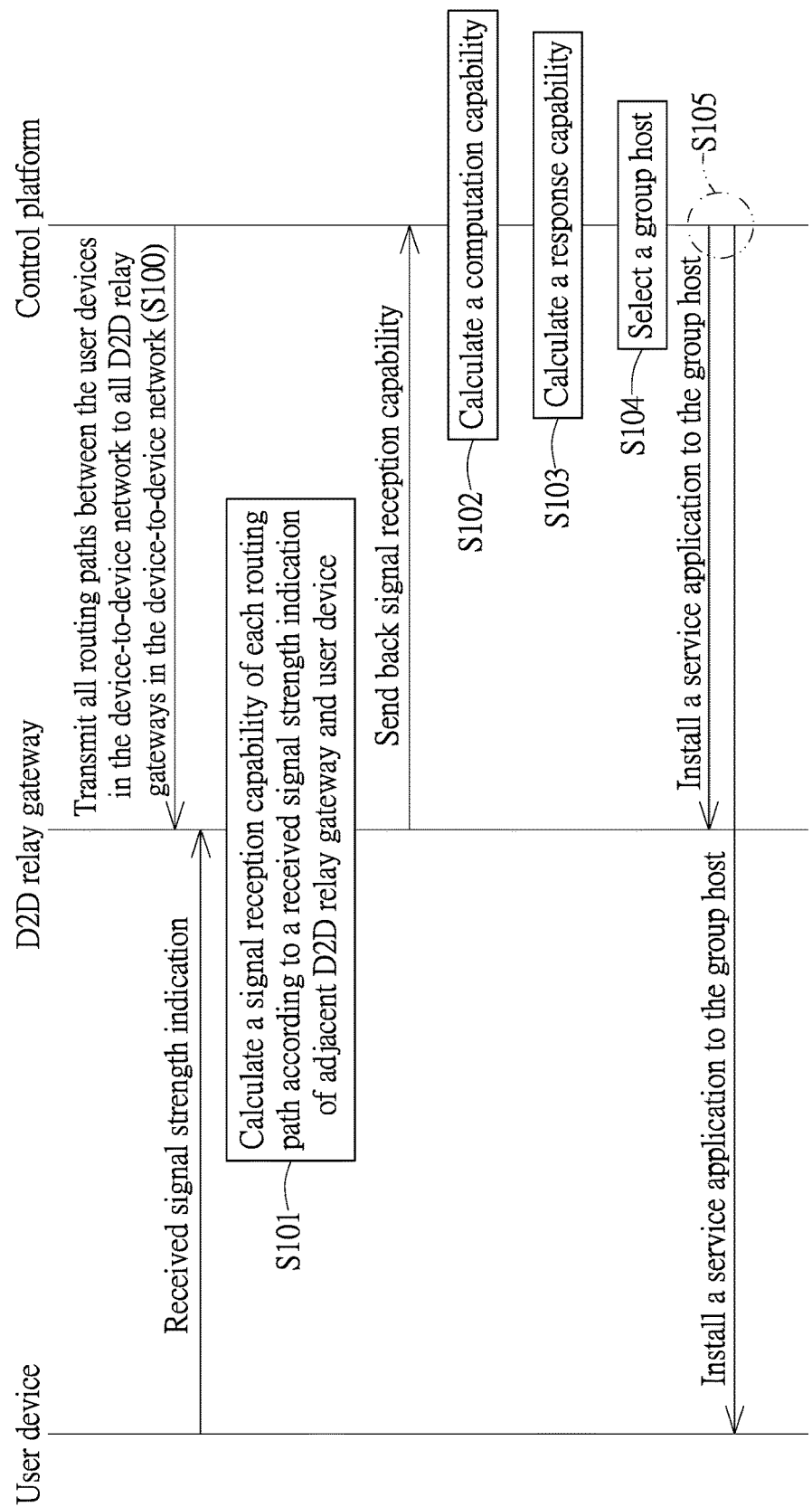
FIG. 1A shows a diagram of a group host selection method for a device-to-device network according to an embodiment of the present disclosure.
Figure 1B:
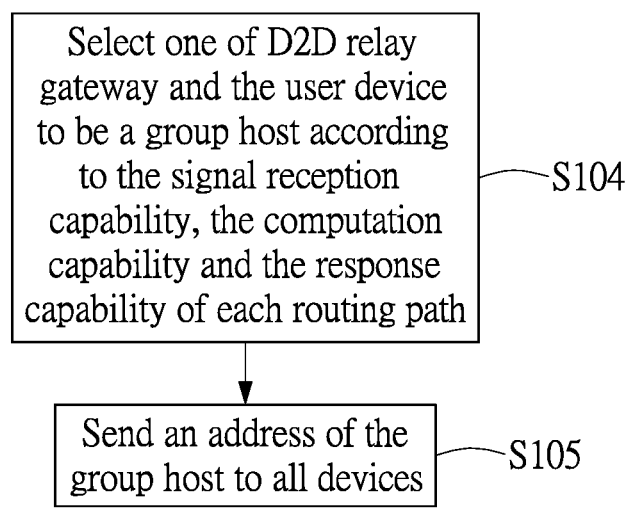
FIG. 1B shows a partial flowchart of the group host selection method of FIG. 1A.

Reference is made to FIG. 1A. FIG. 1A shows a diagram of a group host selection method for a device-to-device network according to an embodiment of the present disclosure, the group host selection method includes the following steps: step S100 is transmitting all routing paths between the user devices (UE) in the device-to-device network to all D2D relay gateways (GW) in the device-to-device network; step S101 is using each D2D relay gateway and user device in the device-to-device network to calculate a signal reception capability of each routing path according to a received signal strength indication (RSSI) of adjacent two devices among D2D relay gateways and user devices; step S102 is using a control platform to calculate a computation capability of each routing path according to parameters, such as a CPU (processor) usage rate and a memory usage rate of all D2D relay gateways and user devices in the device-to-device network; step S103 is using the control platform to calculate a response capability of each routing path according to a response time of each D2D relay gateways and user devices in the device-to-device network; step S104 is using the control platform to select one of the D2D relay gateways and the user devices to be a group host according to the signal reception capability, the computation capability and the response capability of each routing path; and step 105 is using the control platform to install a service application to the group host. Referring to FIG. 1B, FIG. 1B shows a partial flowchart of the group host selection method of FIG. 1A. After step S104, step S105 further includes sending an address of the group host to all devices.

Figure 2A:
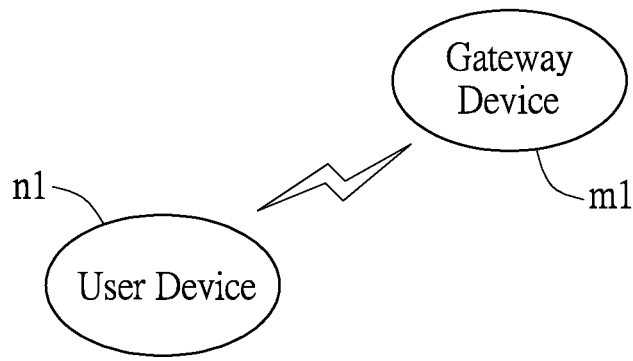
FIG. 2A shows a diagram of a device-to-device network according to an embodiment of the present disclosure.
Figure 2B:
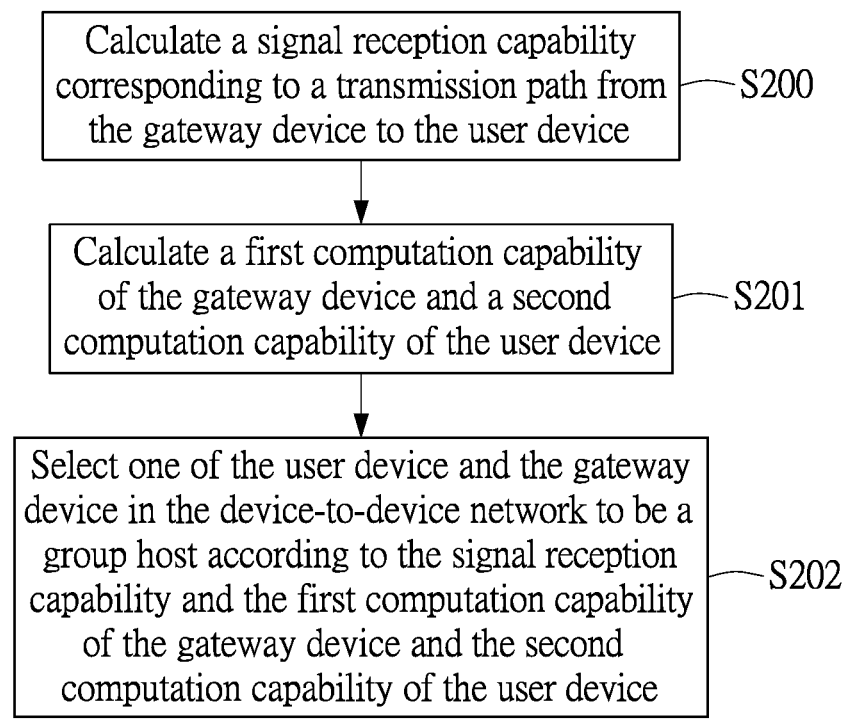
FIG. 2B shows a flowchart of a group host selection method for the device-to-device network of the embodiment in FIG. 2A.
Figure 2C:
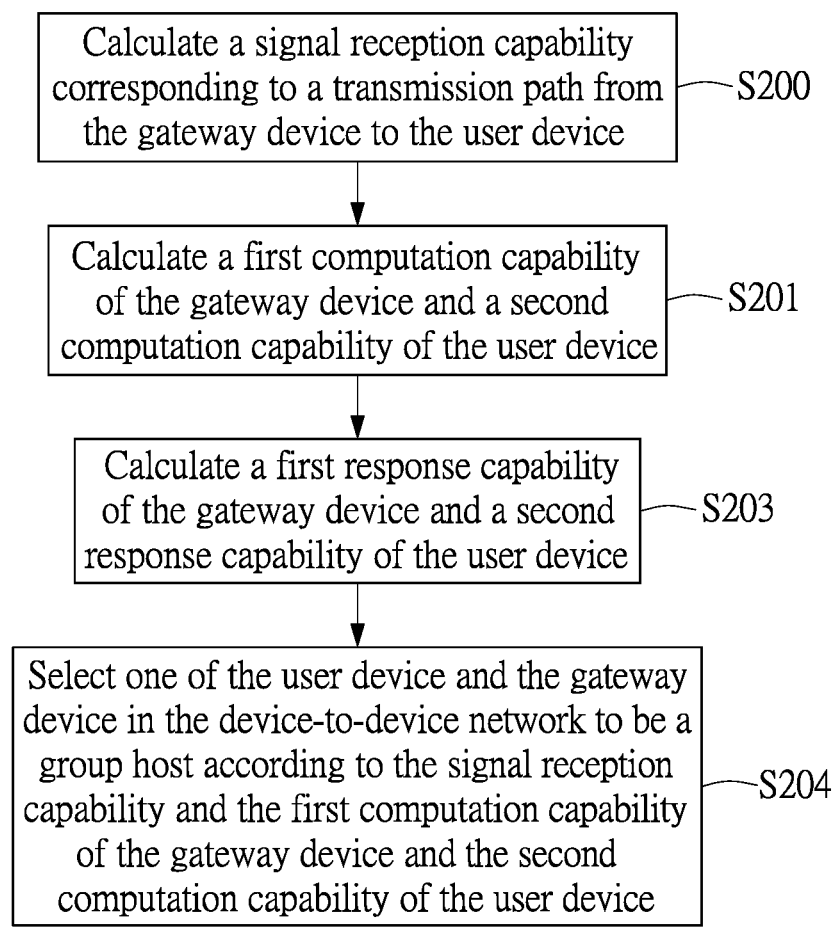
FIG. 2C shows a flowchart of another group host selection method for the device-to-device network of the embodiment in FIG. 2A.
Figure 3A:
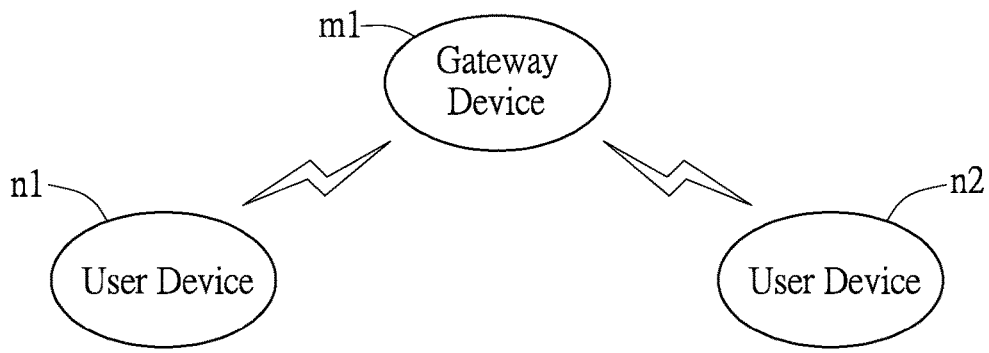
FIG. 3A shows a diagram of a device-to-device network according to another embodiment of the present disclosure.
Figure 3B:
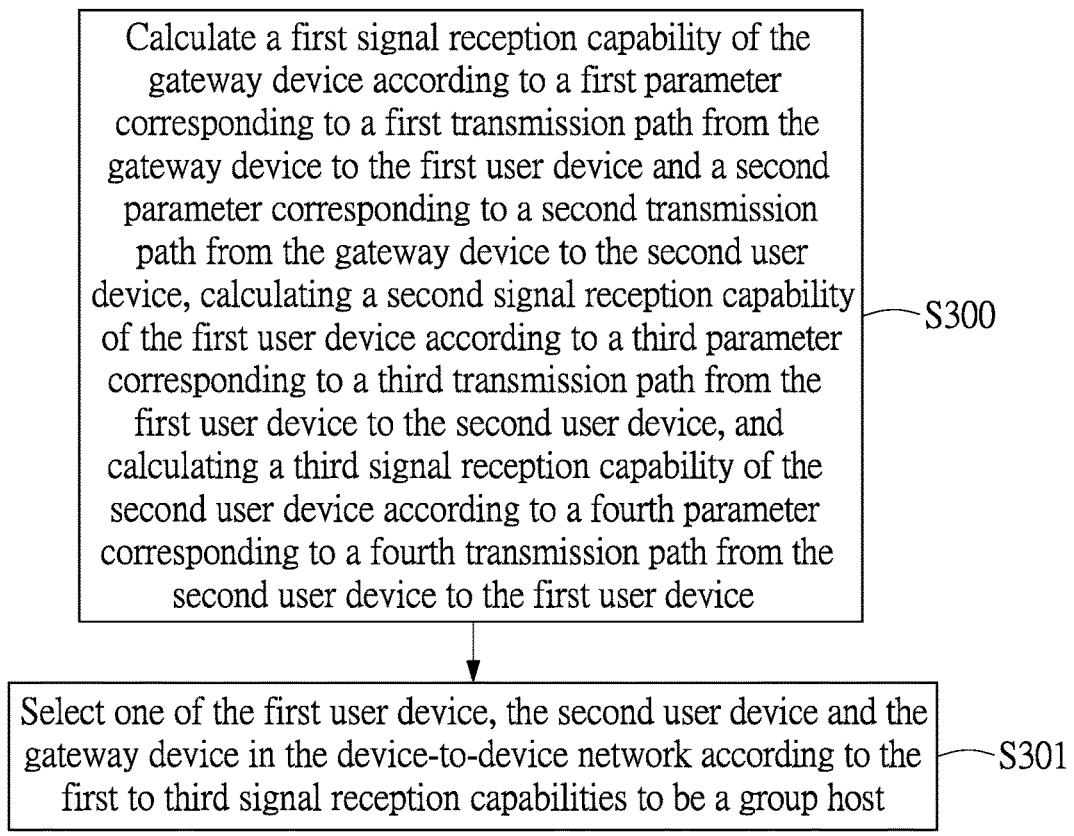
FIG. 3B shows a flowchart of a group host selection method for the device-to-device network of the embodiment in FIG. 3A.
Figure 3C:
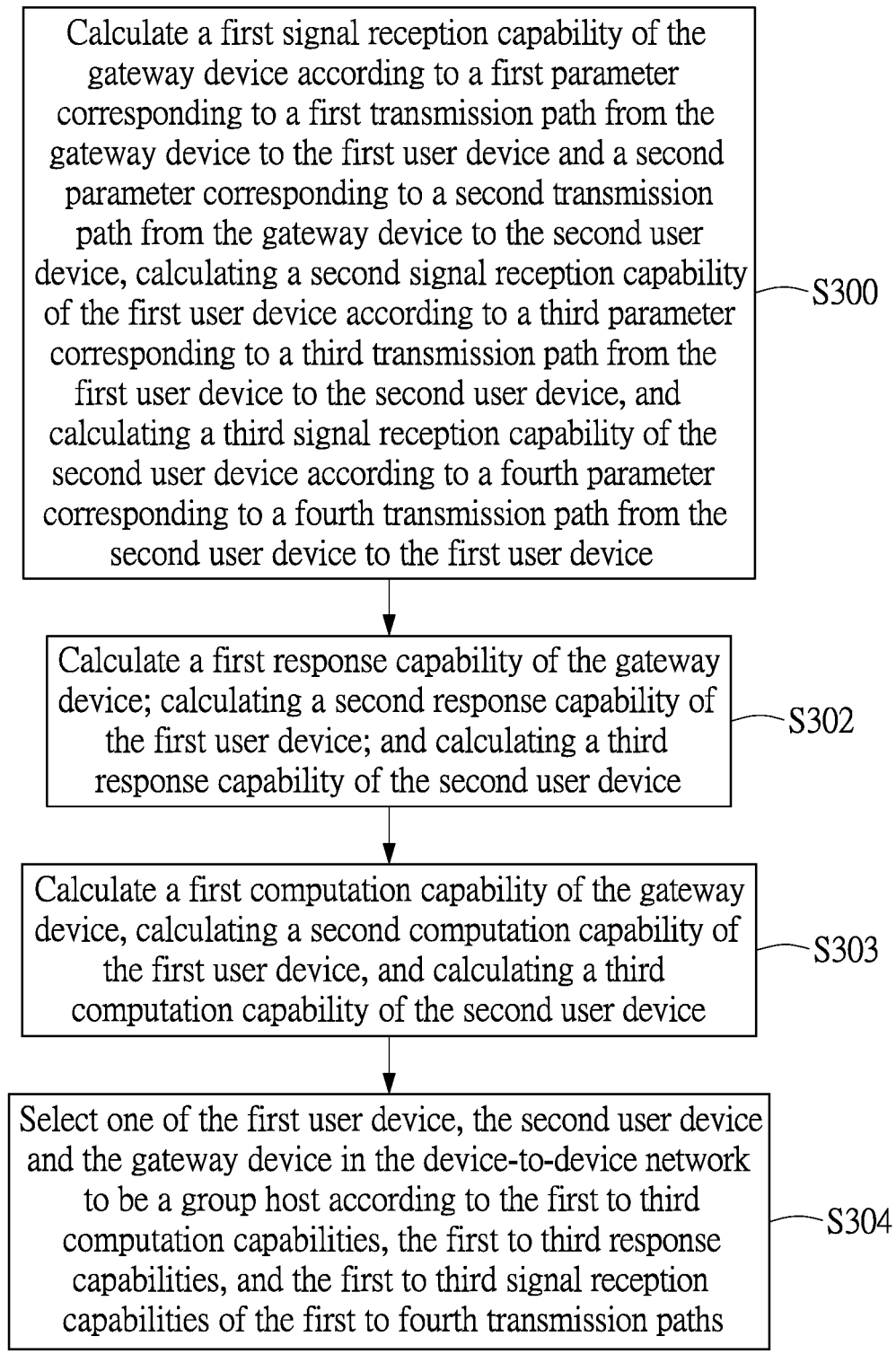
FIG. 3C shows a flowchart of another group host selection method for the device-to-device network of the embodiment in FIG. 3A.

Reference is next made to FIGS. 2A-2C, and FIGS. 3A-3C. FIG. 2A shows a diagram of a device-to-device network according to an embodiment of the present disclosure, FIG. 2B shows a flowchart of a group host selection method for the device-to-device network of the embodiment in FIG. 2A, FIG. 2C shows a flowchart of another group host selection method for the device-to-device network of the embodiment in FIG. 2A, FIG. 3A shows a diagram of a device-to-device network according to another embodiment of the present disclosure, FIG. 3B shows a flowchart of a group host selection method for the device-to-device network of the embodiment in FIG. 3A, and FIG. 3C shows a flowchart of another group host selection method for the device-to-device network of the embodiment in FIG. 3A. As shown in FIG. 2A, the device-to-device network includes a user device n1 and a gateway device m1, and a flowchart of the group host selection method shown in FIG. 2B includes the following steps: step S200 is calculating a signal reception capability S corresponding to a transmission path R from the gateway device m1 to the user device n1; step S201 is calculating a first computation capability P1 of the gateway device m1 and a second computation capability P2 of the user device n1, and a computation capability of each of the gateway device m1 and the user device n1 is calculated by the following formula 1:

$$P_i = a*C_i + b*U_i, i \in \{m_1 \sim m_M, n_1 \sim n_N\}, a+b=1, a, b > 0 \quad \text{(formula 1)}$$

In the embodiment, i is equal to 1-2, $P_i$'s are the computation capabilities, a is a first coefficient, b is a second coefficient, $C_i$'s are remaining load rates of the processor of each of the gateway device and the user device, $U_i$'s are remaining usage rates of the storage unit of each of the gateway device and the user device. A greater $C_i$ of a device represents a greater computation capability of the device, a greater $U_i$ represents a greater storage capability of the device. For example, the following the remaining load rates of the processors and the remaining usage rates of the storage units of the user device and the gateway device are shown in the following table 1.

TABLE 1

| Device in device-to-device network | Remaining load rate of processor | Remaining usage rate of storage unit |
|---|---|---|
| m1 | 10% | 3% |
| n1 | 30% | 12% |

The values of $C_i$, $U_i$ of the gateway device m1 and user device n1 are shown. Next, step S202 is selecting one of the user device n1 and the gateway device m1 in the device-to-device network to be a group host according to the signal reception capability S and the first computation capability P1 of the gateway device m1 and the second computation capability P2 of the user device n1.

In the embodiment, the transmission path R includes two nodes, the gateway device m1 and the user device n1 respectively represents a node. In the step of calculating the signal reception capability S, a set of the received signal fading rates of each two adjacent nodes in the transmission path is calculated, and the set of the received signal fading rates only includes one received signal fading rate $A_{n1,m1}$ between the user device n1 and the gateway device m1. The calculation of the signal reception capability S will be described in detail in formulas 2, 3 below.

Preferably, each of the gateway device m1 and the user device n1 includes a processor and a storage unit (not shown), the first computation capability P1 is determined by a remaining load rate of the processor of the gateway device m1 and a remaining usage rate of the storage unit of the gateway device m1, the second computation capability P2 is determined by a remaining load rate of the processor of the user device n1 and a remaining usage rate of the storage unit of the user device n1.

However, as shown in FIG. 3A, the device-to-device network includes a first user device n1, a second user device n2 and a gateway device m1. The flowchart of the group host selection method in FIG. 3B, different from FIG. 2B, includes the following steps: step S300 is calculating a first signal reception capability S1 of the gateway device m1 according to a first parameter $r_{n1,m1}$ corresponding to a first transmission path R1 from the gateway device m1 to the first user device n1 and a second parameter $r_{m1,n2}$ corresponding to a second transmission path R2 from the gateway device m1 to the second user device n2, calculating a second signal reception capability S2 of the first user device n1 according to a third parameter $r_{n1,n2}$ corresponding to a third transmission path R3 from the first user device n1 to the second user device n2, and calculating a third signal reception capability S3 of the second user device n2 according to a fourth parameter $r_{n2,n1}$ corresponding to a fourth transmission path R4 from the second user device n2 to the first user device n1; and step S301 is selecting one of the first user device n1, the second user device n2 and the gateway device m1 in the device-to-device network according to the first to third signal reception capabilities S1-S3 to be a group host.

Different from the embodiments in FIGS. 2A, 2B, it should be further noted that each of the first to fourth transmission paths R1-R4 includes a plurality of nodes, in the step of calculating the first signal reception capability S1, the second signal reception capability S2 and the third signal reception capability S3, a set of received signal fading rates of each two adjacent nodes in the first to fourth transmission paths R1-R4 are respectively calculated, and the first signal reception capability S1 is obtained by the set of the received signal fading rates of the first transmission path R1 and the second transmission path R2, the second signal reception capability S2 is obtained by the set of the received signal fading rates of the third transmission path R3, the third signal reception capability S3 is obtained by the set of the received signal fading rates of the fourth transmission path R4.

Preferably, the first to third signal reception capabilities S1-S3 of the first to fourth transmission paths R1-R4 are calculated by the following formula 2 and formula 3:

$$S_i = \frac{1}{N} \sum_{j=n_1+n_N, j \neq i} A_{i,j}, (i \in \{m_1 \sim M_M, n_1 \sim n_N\}) \quad \text{(formula 2)}$$

$$A_{i,j} = \prod_{(s,t) \in \Omega_{i,j}} 10^{\frac{r_{s,t}}{100}} \quad \text{(formula 3)}$$

In the embodiment, $S_i$'s are the signal reception capabilities, i represents a starting node, j represents an ending node, $m_1$-$m_M$ represent the gateway devices, M represents a number of the gateway devices, M is equal to 1 here, and $n_1$-$n_N$ represent the user devices, N represents a number of the user devices, N is equal to 2 here, $A_{i,j}$ represents a set of received signal fading rates between two adjacent node s and node t in a transmission path of communication packages from node i to node j, $10^{r(s,t)/100}$ represents the received signal fading rate from node s to node t, $\Omega_{i,j}$ represents that any two of the user devices and the gateway device are node s and node t. The formula may be preferably applied in the embodiment shown in FIG. 2A. It should be noted that, since the ending node is UE in the embodiment in FIG. 2A, and there is only one user device, the signal reception capability of the user device n1 is 0, and the signal reception capability of the gateway device m1 is greater than 0. If the group host selection method for the device-to-device network is based only on the signal reception capability, the group host would be the gateway device m1.

In addition to the signal reception capability, the group host selection method may also use other values of the devices, such as the computation capability or, as shown in FIG. 2C, the group host selection method can further include the following steps: step S203 is calculating a first response capability of the gateway device m1 and a second response capability of the user device n1. The first and second response capabilities are calculated by the following formula 4:

$$D_i = \frac{T_{max} - T_i}{T_{max}} \quad \text{(formula 4)}$$

In the embodiment, $D_i$'s are the first and second response capabilities, $T_i$'s are a first delay time of a first communication circuit in the gateway device and a second delay time of a second communication circuit in the user device, $T_{max}$ is a greater one of the first delay time and the second delay time. Finally, step S204 is selecting one of the user device n1 and the gateway device m1 in the device-to-device network to be a group host according to the signal reception capability S and the first computation capability P1 of the gateway device m1 and the second computation capability P2 of the user device n1.

Similarly, the group host selection method of the embodiment shown in FIG. 3C further includes the following steps: step S302 is calculating a first response capability of the gateway device m1; calculating a second response capability of the first user device n1; and calculating a third response capability of the second user device n2. The first response capability, the second response capability and the third response capability is also calculated by the above formula 4.

In the embodiment, i is equal to 1-3, $D_i$'s are the first to third response capabilities, $T_i$'s are respectively a first delay time of a first communication circuit of the gateway device m1, a second delay time of a second communication circuit of the first user device n1 and a third delay time of a third communication circuit of the second user device n2, $T_{max}$ is a greatest one of the first delay time, the second delay time and the third delay time, the delay time above coming from a response time of a hardware when a program in the gateway device or the user device sends a command to the hardware; step S303 is calculating a first computation capability of the gateway device m1, calculating a second computation capability of the first user device n1, and calculating a third computation capability of the second user device n2. Each of the gateway device m1, the first user device n1 and the second user device n2 in FIG. 3A, as those in FIG. 2A, includes a processor and a storage unit (not shown), and the first to third computation capabilities P1-P3 of the gateway device m1, the first user device n1 and the second user device n2 are also calculated by the above formula 1 (1 is equal to 1-3 here). Finally, step S304 is selecting one of the first user device, the second user device and the gateway device in the device-to-device network to be a group host according to the first to third computation capabilities P1-P3, the first to third response capabilities D1-D3, and the first to third signal reception capabilities S1-S3 of the first to fourth transmission paths R1-R4.

Figure 5:
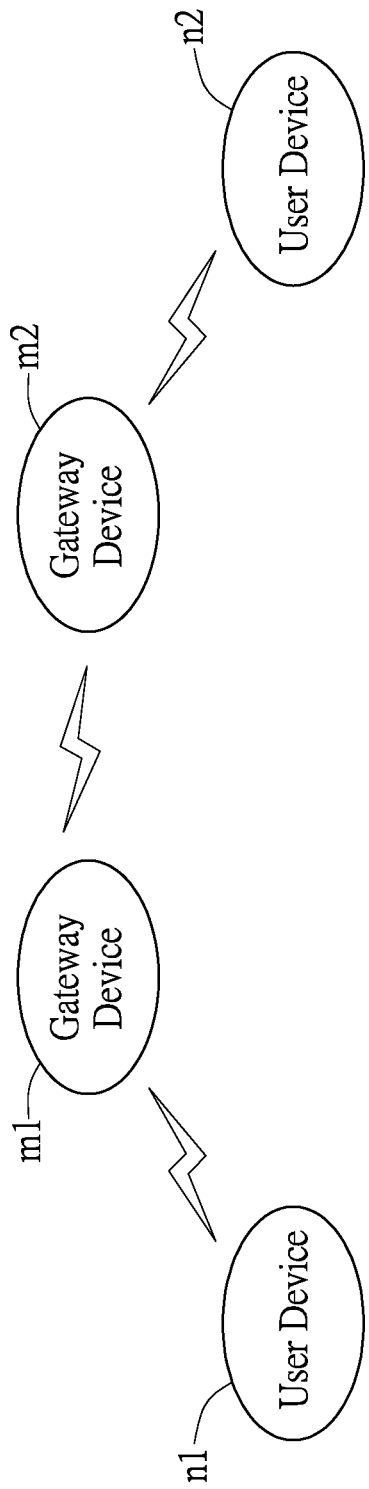
FIG. 5 shows a device-to-device network according to an embodiment of the present disclosure.

Reference is made to FIG. 5. FIG. 5 shows a device-to-device network according to an embodiment of the present disclosure, as shown in FIG. 5, $r_{n1,m1}$, $r_{n1,m2}$, $r_{n2,m1}$, $r_{n2,m2}$, $r_{n1,n2}$, $r_{n2,n1}$ are parameters from a starting node to a ending node (user device n1 or user device n2), and corresponding parameters $A_{m1,n1}$, $A_{m2,n1}$, $A_{m1,n2}$, $A_{m2,n2}$, $A_{n1,n2}$, $A_{n2,n1}$ are calculated by $$A_{i,j} = \Pi_{(s,t) \in \Omega_{i,j}} 10^{\frac{r_{s,t}}{100}}$$

in the above formula 3:

$A_{m1,n1} = 10^{-0.5} = 0.316$ $A_{m1,n2} = 10^{-0.45} \cdot 10^{-0.6} = 10^{-1.05} = 0.089$ $A_{m2,n1} = 10^{-0.45} \cdot 10^{-0.5} = 10^{-0.95} = 0.112$ $A_{m2,n2} = 10^{-0.6} = 0.251$ $A_{n1,n2} = 10^{-0.5} \cdot 10^{-0.45} \cdot 10^{-0.6} = 10^{-1.55} = 0.028$ $A_{n2,n1} = 10^{-0.6} \cdot 10^{-0.45} \cdot 10^{-0.5} = 10^{-1.55} = 0.028$ Next, table 2 is obtained by the above formulas 1-4. As shown in the following table 2, a group host is determined by parameters calculated by the following formula 5:

$W_i = S_i + P_i + D_i$ (formula 5)

TABLE 2

| Device (i) | $S_i$ | $C_i$ | $U_i$ | $P_i$ | $T_i$ | $D_i$ | $W_i$ | Order |
|---|---|---|---|---|---|---|---|---|
| m1 | $\frac{(0.316 + 0.089)}{2} = 0.2025$ | 10% | 3% | 0.072 | 60 | 0.294 | 0.5685 | 2 |
| m2 | $\frac{(0.112 + 0.251)}{2} = 0.1815$ | 23% | 23% | 0.23 | 52 | 0.388 | 0.7995 | 1 |
| n1 | $\frac{(0.028)}{2} = 0.014$ | 30% | 12% | 0.228 | 85 | 0 | 0.242 | 4 |
| n2 | $\frac{(0.028)}{2} = 0.014$ | 45% | 35% | 0.41 | 76 | 0.106 | 0.53 | 3 | i is equal to n1, n2, m1, m2 corresponding to the first and second user devices and the first and second gateway devices. Finally, the device corresponding to the greatest one of $W_{n1}$, $W_{n2}$, $W_{m1}$, $W_{m2}$ is the group host, and as shown in the order column, the order is $W_{m2} > W_{n2} > W_{m1} > W_{n1}$, and the group host is the gateway device m2. It should be noted that, formula 5 should not be construed as limiting the scope of present disclosure, different weighting values may be applied to different capabilities depending on design. Similarly, table 3 are the values of the embodiment shown in FIG. 2A.

TABLE 3

| Device (i) | Si | Ci | Ui | Pi | Ti | Di | Wi | Order |
|---|---|---|---|---|---|---|---|---|
| m1 | 0.316 | 10% | 3% | 0.072 | 60 | 0.294 | 0.682 | 1 |
| n1 | 0 | 30% | 12% | 0.228 | 85 | 0 | 0.228 | 2 |

Figure 6:
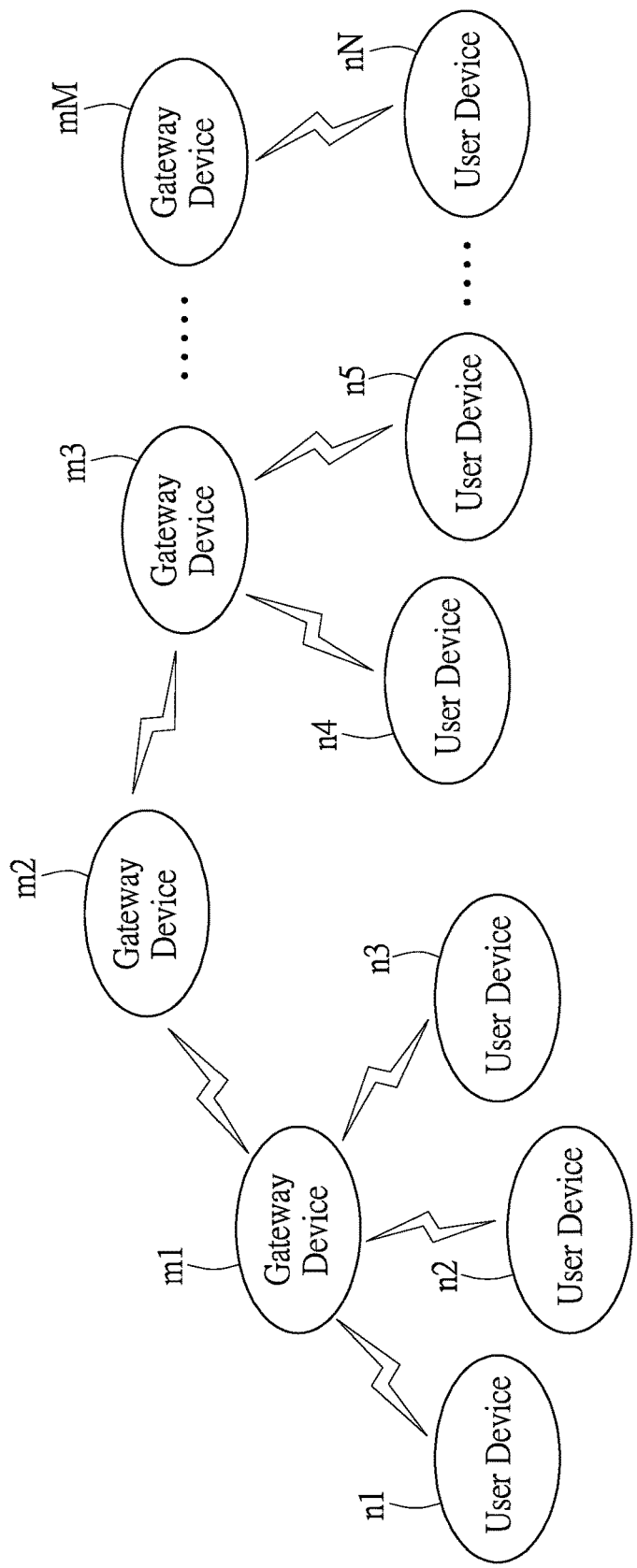
FIG. 6 shows a device-to-device network according to another embodiment of the present disclosure.

The group host here is the gateway device in FIG. 2A. Similarly, the device-to-device network may be extended to the embodiment with M gateway devices and N user devices shown in FIG. 6.

Figure 4:
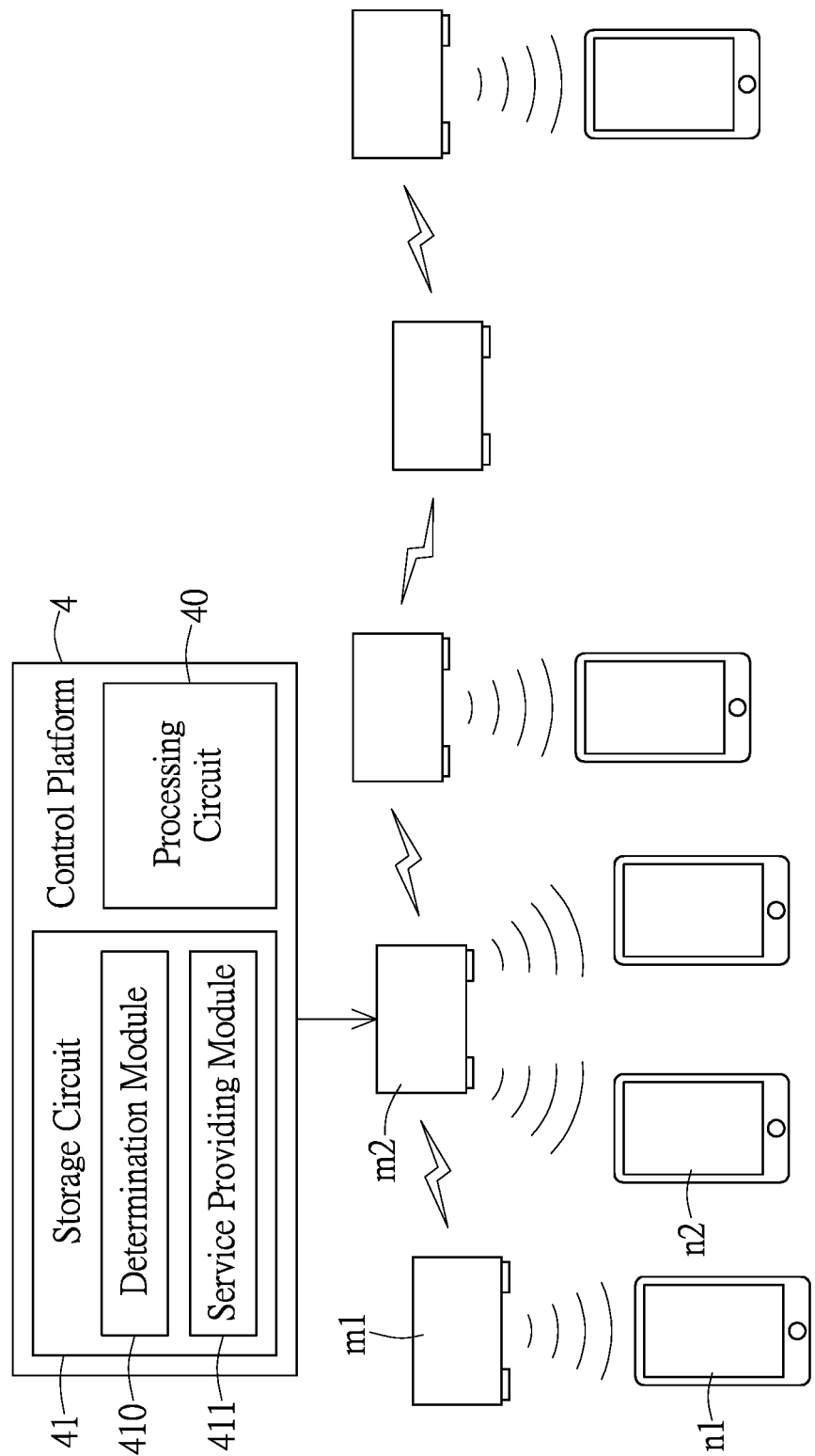
FIG. 4 shows a diagram of a control platform for selecting a group host in the embodiments in FIG. 3A-3C.

Please refer to FIG. 4, which shows a diagram of a control platform for selecting a group host in the embodiments in FIGS. 3A-3C. The control platform 4 shown in FIG. 4 for selecting the group host may be applied to the embodiments in FIGS. 3A-3C, the control platform 4 includes a processing circuit 40 and a storage circuit 41, the storage circuit 41 storing a determination module 410 and a service providing module 411, and the control platform 4 may be arranged on any device in the device-to-device network. In the embodiment, the control platform 4 is the gateway device m2, and the processing circuit 40 is a processor of the gateway device m2. The service providing module 411 provides a first service procedure corresponding to a first service to the group host in the device-to-device network, and the group host performs the first service according to the first service procedure. The group host is selected from one of the first user device n1, the second user device n2 and the gateway device m1 according to a first signal reception capability S1 calculated by a first parameter $r_{m1,n1}$ corresponding to a first transmission path R1 from the gateway device m1 to the first user device n1 and a second parameter $r_{m1,n2}$ corresponding to a second transmission path R2 from the gateway device m1 to the second user device n2, according to a second signal reception capability S2 calculated by a third parameter $r_{n1,n2}$ corresponding to a third transmission path R3 from the first user device n1 to the second user device n2, and according to a third signal reception capability S3 calculated by a fourth parameter $r_{n2,n1}$ corresponding to a fourth transmission path R4 from the second user device n2 to the first user device n1. The group host performs the first service according to the first service procedure.

The determination module 410 may be implemented with software or hardware, such as a program or a logic circuit, and may be arranged in a storage unit of each of the first user device n1, the second user device n2 and the first gateway device m1 in the device-to-device network. The control platform 4 for selecting the group host in FIG. 4 may be applied to the embodiments in FIGS. 3A-3C with the same steps described in the FIGS. 3A-3C, so that details thereon are omitted herein.

In summary, the present disclosure selects a group host to collect, analyze and calculate information in the network simultaneously, and the group host selection method may be performed by a program installed in any device in the device-to-device network.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. A group host selection method for a device-to-device network, the device-to-device network including a user device and a gateway device, the group host selection method comprising the following steps:
   calculating a signal reception capability corresponding to a transmission path from the gateway device to the user device;
   calculating a first computation capability of the gateway device;
   calculating a second computation capability of the user device;
   selecting one of the user device and the gateway device in the device-to-device network to be a group host according to the signal reception capability and the first computation capability of the gateway device and the second computation capability of the user device;
   calculating a first response capability of the gateway device; and
   calculating a second response capability of the user device;
   wherein the first and second response capability is calculated by the following formula:

$$D_i = \frac{T_{max} - T_i}{T_{max}},$$

wherein i is equal to 1-2, $D_i$'s are the first and second response capabilities, $T_i$'s are a first delay time of a first communication circuit in the gateway device and a second delay time of a second communication circuit in the user device, $T_{max}$ is a greater one of the first delay time and the second delay time.

2. The group host selection method of claim 1, wherein the transmission path includes a plurality of nodes and the signal reception capability is obtained by a set of received signal fading rates of each two adjacent nodes in the transmission path.

3. The group host selection method of claim 2, wherein each of the gateway device and the user device includes a processor and a storage unit, the first computation capability is determined by a remaining load rate of the processor of the gateway device and a remaining usage rate of the storage unit of the gateway device, the second computation capability is determined by a remaining load rate of the processor of the user device and a remaining usage rate of the storage unit of the user device.

4. A group host selection method for a device-to-device network, the device-to-device network including a first user device, a second user device and a gateway device, the group host selection method comprising the following steps:
   calculating a first signal reception capability of the gateway device according to a first parameter corresponding to a first transmission path from the gateway device to the first user device and a second parameter corresponding to a second transmission path from the gateway device to the second user device;
   calculating a second signal reception capability of the first user device according to a third parameter corresponding to a third transmission path from the first user device to the second user device; and
   calculating a third signal reception capability of the second user device according to a fourth parameter corresponding to a fourth transmission path from the second user device to the first user device;
   wherein one of the first user device, the second user device and the gateway device in the device-to-device network is selected to be a group host according to the first to third signal reception capabilities;
   wherein each of the gateway device, the first user device and the second user device in the device-to-device network includes a processor and a storage unit, the first to third computation capabilities of the gateway device, the first user device and the second user device in the device-to-device network are calculated by the following formula:

$$P_i = a*C_i + b*U_i, i \in \{m_1 \sim m_M, n_1 \sim n_N\}, a+b=1, a,b>0;$$

wherein i is equal to 1-3, $P_i$'s are the computation capabilities, a is a first coefficient, b is a second coefficient, $C_i$'s are remaining load rates of the processor of each of the gateway device, the first user device and the second user device, $U_i$'s are remaining usage rates of the storage unit of each of the gateway device, the first user device and the second user device.

5. The group host selection method of claim 4, wherein each of the first to fourth transmission paths includes a plurality of nodes, and in the step of calculating the first signal reception capability, the second signal reception capability and the third signal reception capability, a set of received signal fading rates of each two adjacent nodes in the first to fourth transmission paths are respectively calculated, the first signal reception capability is obtained by the set of the received signal fading rates of the first transmission path and the second transmission path, the second signal reception capability is obtained by the set of the received signal fading rates of the third transmission path, and the third signal reception capability is obtained by the set of the received signal fading rates of the fourth transmission path.

6. The group host selection method of claim 5, wherein each of the gateway device, the first user device and the second user device includes a processor and a storage unit, a first computation capability of the gateway device is determined by a remaining load rate of the processor of the gateway device and a remaining usage rate of the storage unit of the gateway device, a second computation capability of the first user device is determined by a remaining load rate of the processor of the first user device and a remaining usage rate of the storage unit of the first user device, and a third computation capability of the second user device is determined by a remaining load rate of the processor of the second user device and a remaining usage rate of the storage unit of the second user device.

7. The group host selection method of claim 6, further comprising the following steps:
selecting one of the first user device, the second user device and the gateway device in the device-to-device network to be the group host according to the first to third signal reception capabilities and the first to third computation capabilities of the first to fourth transmission paths.

8. The group host selection method of claim 6 further comprising:
calculating a first response capability of the gateway device;
calculating a second response capability of the first user device; and
calculating a third response capability of the second user device;
wherein the first response capability, the second response capability and the third response capability are calculated by the following formula:

$$D_i = \frac{T_{max} - T_i}{T_{max}},$$

wherein i is equal to 1-3, $D_i$'s are the first to third response capabilities, $T_i$'s are respectively a first delay time of a first communication circuit of the gateway device, a second delay time of a second communication circuit of the first user device and a third delay time of a third communication circuit of the second user device, $T_{max}$ is a greatest one of the first delay time, the second delay time and the third delay time.

9. The group host selection method of claim 8, wherein one of the first user device, the second user device and the gateway device in the device-to-device network is selected to be the group host according to the first to third signal reception capabilities of the first to fourth transmission paths and the first to third response capabilities in the device-to-device network in the device-to-device network.

10. The group host selection method of claim 5, wherein the first to third signal reception capabilities of the first to fourth transmission paths are calculated by the following formula:

$$S_i = \frac{1}{N} \sum_{j=n_1+n_N, j \neq i} A_{i,j}, (i \in \{m_1 \sim M_M, n_1 \sim n_N\}); \text{ and}$$

$$A_{i,j} = \prod_{(s,t) \in \Omega_{i,j}} 10^{\frac{r_{s,t}}{100}};$$

wherein $S_i$'s are the signal reception capabilities, i represents a starting node, j represents an ending node, $m_1$-$m_M$ represent the gateway devices, M represents a number of the gateway devices, and $n_1$-$n_N$ represent the user devices, N represents a number of the user devices, $A_{i,j}$ represents a set of received signal fading rates between two adjacent node s and node t in a transmission path where communication packets transmit from node i to node j, $10^{r(s,t)/100}$ represents the received signal fading rate from node s to node t, $\Omega_{i,j}$ represents that any two of the user devices and the gateway device are node s and node t.

11. A control platform selecting a group host in a device-to-device network, the device-to-device network including a first user device, a second user device and a first gateway device, the control platform comprising:
a processing circuit; and
a storage circuit storing a determination module;
wherein the determination module instructs the processing circuit to select one of the first user device, the second user device and the gateway device to be the group host according to a first signal reception capability calculated by a first parameter corresponding to a first transmission path from the gateway device to the first user device and a second parameter corresponding to a second transmission path from the gateway device to the second user device, according to a second signal reception capability calculated by a third parameter corresponding to a third transmission path from the first user device to the second user device, and according to a third signal reception capability calculated by a fourth parameter corresponding to a fourth transmission path from the second user device to the first user device;
wherein the first to third signal reception capabilities of the first to fourth transmission paths are calculated by the following formula:

$$S_i = \frac{1}{N} \sum_{j=n_1-n_N, j \neq 1} A_{i,j}, (i \in \{m_1 \sim m_M, n_1 \sim n_N\}); \text{ and}$$

$$A_{i,j} = \prod_{(s,t) \in \Omega_{i,j}} 10^{\frac{r_{s,t}}{100}};$$

wherein $S_i$'s are the signal reception capabilities, i represents a starting node, j represents an ending node, $m_1$-$m_M$ represent the gateway devices, M represents a number of the gateway devices, and $n_1$-$n_N$ represent the user devices, N represents a number of the user devices, $A_{i,j}$ represents a set of received signal fading rates between two adjacent node s and node t in a transmission path where communication packets transmit from node i to node j, $10^{r(s,t)/100}$ represents the received signal fading rate from node s to node t, $\Omega_{i,j}$ represents that any two of the user devices and the gateway device are node s and node t.

12. The control platform of claim 11, wherein each of the first to fourth transmission paths includes a plurality of nodes, and in the step of calculating the first signal reception capability, the second signal reception capability and the third signal reception capability, a set of received signal fading rates of each two adjacent nodes in the first to fourth transmission paths are respectively calculated, the first signal reception capability is obtained by the set of the received signal fading rates of the first transmission path and the second transmission path, the second signal reception capability is obtained by the set of the received signal fading rates of the third transmission path, and the third signal reception capability is obtained by the set of the received signal fading rates of the fourth transmission path.

13. The control platform of claim 12, wherein the processing circuit of the control platform calculates a first to third computation capability corresponding to the gateway device, the first user device and the second user device in the device-to-device network, wherein each of the gateway device, the first user device and the second user device includes a processor and a storage unit, a first computation capability of the gateway device is determined by a remaining load rate of the processor of the gateway device and a remaining usage rate of the storage unit of the gateway device, a second computation capability of the first user device is determined by a remaining load rate of the processor of the first user device and a remaining usage rate of the storage unit of the first user device, and a third computation capability of the second user device is determined by a remaining load rate of the processor of the second user device and a remaining usage rate of the storage unit of the second user device.

14. The control platform of claim 13, wherein the processing circuit of the control platform calculates a first to third response capability of the gateway device, the first user device and the second user device in the device-to-device network, wherein the first to third response capabilities are calculated by the following formula:

$$D_i = \frac{T_{max} - T_i}{T_{max}},$$

wherein i is equal to 1-3, $D_i$'s are the first to third response capabilities, $T_i$'s are respectively a first delay time of a first communication circuit of the gateway device, a second delay time of a second communication circuit of the first user device and a third delay time of a third communication circuit of the second user device, $T_{max}$ is a greatest one of the first delay time, the second delay time and the third delay time.

15. The group host selection method of claim 13, wherein each of the gateway device, the first user device and the second user device in the device-to-device network includes a processor and a storage unit, the first to third computation capabilities of the gateway device, the first user device and the second user device in the device-to-device network are calculated by the following formula:

$$P_i = a*C_i + b*U_i, i \in \{m_1 \sim m_M, n_1 \sim n_N\}, a+b=1, a,b>0$$

wherein i is equal to 1-3, $P_i$'s are the computation capabilities, a is a first coefficient, b is a second coefficient, $C_i$'s are remaining load rates of the processor of each of the gateway device, the first user device and the second user device, $U_i$'s are remaining usage rates of the storage unit of each of the gateway device, the first user device and the second user device.

* * * * *